United States Patent [19]
Kleider et al.

[11] Patent Number: 6,154,489
[45] Date of Patent: Nov. 28, 2000

[54] ADAPTIVE-RATE CODED DIGITAL IMAGE TRANSMISSION

[75] Inventors: John Eric Kleider; Glen Patrick Abousleman, both of Scottsdale, Ariz.

[73] Assignee: Motorola, Inc., Schaumburg, Ill.

[21] Appl. No.: 09/050,504

[22] Filed: Mar. 30, 1998

[51] Int. Cl.[7] .................................................. H04B 1/38
[52] U.S. Cl. ........................ 375/221; 375/259; 375/377
[58] Field of Search .................................. 375/220, 221, 375/259, 252, 257, 295, 316, 358, 377; 358/539, 407, 426; 340/870.42; 714/750; 455/24, 69; 370/282, 274, 278

[56] References Cited

U.S. PATENT DOCUMENTS

| | | | |
|---|---|---|---|
| 4,756,007 | 7/1988 | Qureshi et al. ............................ | 375/37 |
| 5,243,428 | 9/1993 | Challapali et al. ...................... | 348/607 |
| 5,442,625 | 8/1995 | Gitlin et al. ............................... | 370/18 |
| 5,541,657 | 7/1996 | Yamamoto et al. ...................... | 348/388 |
| 5,541,955 | 7/1996 | Jacobsmeyer ............................ | 375/222 |
| 5,671,156 | 9/1997 | Weerackody et al. ..................... | 714/52 |
| 5,689,439 | 11/1997 | Weerackody et al. .................. | 370/329 |
| 5,774,483 | 6/1998 | Hwang ..................................... | 714/815 |
| 5,842,113 | 11/1998 | Nanda et al. .............................. | 455/69 |

*Primary Examiner*—Tesfaldet Bocure
*Assistant Examiner*—Emmanuel Bayard
*Attorney, Agent, or Firm*—John C. Scott; Frank J. Bogacz

[57] ABSTRACT

An adaptive arrangement and method for the coded digital transmission of images includes an adaptive transmitter (101) having an image coder (109) which is operable at multiple image coding rates, a channel coder (111) which is operable at a plurality of channel coding rates, and is further operable to provide a plurality of power outputs, baud rates, and a plurality of image delivery rates. The transmitter (101) further includes a channel status monitor (115) which monitors the communication channel (105) connecting the transmitter (101) to a receiver (103). The channel status monitor (115) responds to changes in the quality of the communications channel by varying one or more of the image coding rate, the channel coding rate, the power, the baud rate, and the image delivery rate.

11 Claims, 14 Drawing Sheets

ADAPTIVE-RATE CODED DIGITAL IMAGE TRANSMISSION

BACKGROUND OF THE INVENTION

This invention pertains to methods and apparatus for the transmission of digital images.

Present day digital image compression communication systems suffer from degraded image quality for changing channel conditions because of large variations in digital performance parameters such as bit error rate or received bit energy to noise density ratio. Such systems are only usable over a slight range of these varying channel conditions.

The benefits of adaptive rate modulation (ARM) have been established with digital multi-media communications systems and for digital voice communication systems but have not had significant application to image transmission.

BRIEF DESCRIPTION OF THE DRAWINGS

The invention will be better understood from a reading of the following description taken in conjunction with the several figures of the drawing in which like reference designators are used to designate like elements, and in which.

DETAILED DESCRIPTION

This invention significantly improves the quality of a digitally transmitted image over the varying channel conditions. Image quality is significantly improved for both additive white Gaussian noise and fading channels. Image quality is significantly improved during the most adverse channel degradations. This invention reduces the complexity encountered using fixed aggregate rate schemes. In fixed aggregate rate systems the source and channel coding rates are allowed to vary, but the whole sum of the image coding bit rate plus the channel coding bit rate is constant. Thus, if the aggregate rate is fixed, the sum of the rates of the source and channel coding is equal to the aggregate rate. Optimal image quality is obtained by allowing the transmitter power level to vary, and utilizing multiple source encoding rates, channel coding rates/strategies, modem diversity, and image delivery rate. The method of the invention also provides improved processing gains for spread spectrum communication systems where low probability of intercept (LPI) and low probability of detection (LPD) are important.

Figure 1:
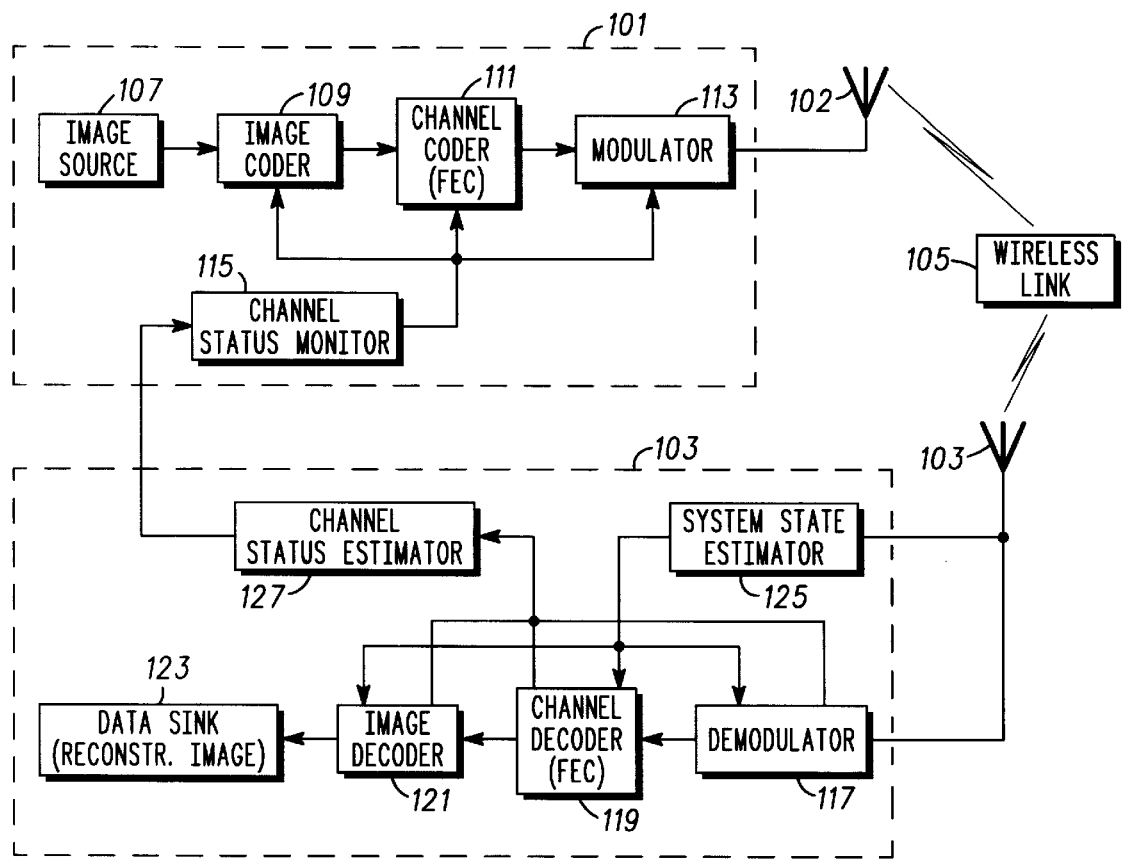
FIG. 1 is a block diagram of a system in accordance with the principles of the invention.

The method and apparatus of the invention improves the quality of digitally transmitted compressed digital imagery over degraded wireless communication links. The method and apparatus will also improve the quality of the same imagery transmitted over wireline communication links. The block diagram of an image communication system employing the adaptive technique of the invention is shown in FIG. 1. Based on the symbol rate of the modem, critical operating points ($OP_{crit}$) are computed. These critical operating points determine the optimum image coding rate, channel coding rate, channel coding strategy, and the process of modulation/demodulation. For a fixed symbol rate, the optimum operating parameters can only provide a sufficient image quality for a mild change in channel conditions. If channel conditions change sufficiently, the previous operating parameters are no longer optimal for providing the maximum image quality possible given a new set of channel conditions. In accordance with the invention, new critical operating points are determined so that the system can now operate optimally for the current channel conditions. This system is adaptive to varying communication channel conditions such that the optimal image quality is obtained. There are two main sources of degradation, as compared to an uncompressed image, to image quality. The first is due to lossy source coding of the original image. Provided this loss is minimal the second major source is due to channel bit errors. This technique jointly minimizes the distortion due to channel bit errors, i.e., increased bit errors occur in the channel due to a reduction in the available channel capacity, and distortion due to lower source coding bit rates.

Channel status is defined as the state of the channel that requires critical operating points, denoted as $OP_{crit}(i)$ for optimal image quality for the ith channel condition. The channel status is determined by measuring, for example, the quality, signal to noise ratio (S/N), and symbol error rate (SER) or bit error rate (BER) of the received signal. The value of this parameter determines the condition (or status) of the digital image communication channel. The critical operating points are determined according to the communication system's BER (or SER) vs. S/N and bit sensitivity performance. Thus, as the channel status changes, so must the critical operating points. The initial state of the system can be set at a reasonable expected channel condition, based on the average signal quality, S/N and BER or SER measured during operational testing of the system in the field. This initial state is set by the transmitter 101, decoded by a system state estimator 125 at receiver 103. The system state estimator 125 then outputs the critical operating points for the system at the current channel condition state determined by the transmitter and is denoted as $OP_{crit}(i)$. All encoding and decoding processes are based on $OP_{crit}(i)$. Receiver 103 constantly monitors channel status via performance parameters from demodulator 117, channel decoder 119, and image decoder 121. If channel statistics have been determined to have changed significantly enough, the Channel Status Estimator 127 then computes a new set of critical operating parameters for the system. This means that $OP_{crit}(i)=OP_{crit}(i+1)$ if the channel has not changed significantly, where if the channel status were determined to have changed significantly, $OP_{crit}(i)$ would be different than $OP_{crit}(i+1)$. The magnitude of the change in the channel status will thus determine which critical parameters change and to what degree of change is required.

Classical BER is usually seen to be a function of the received signal-to-noise ratio (SNR). Received SNR is a parameter that changes due to a multitude of causes. The channel model is used as a vehicle to simulate these causes of variation in the SNR. BER is then a critical parameter used to estimate the performance of the communication system. In order to minimize the effects of variations in SNR on system performance, the BER must be estimated accurately. This accurate BER estimate will allow the system to intelligently adapt to changing channel conditions. The BER can be estimated from the statistics of the SNR of the demodulator constellation, from the error corrections of the channel coder (and from the error corrections of the inner decoder, if any). The amount of fading and link margins can be estimated from the time variance of the measured SNR and BER statistics.

When error (channel) coding is used, the error rate (BER) can be estimated by averaging the number of corrected errors over a sufficiently long number of received bits (or symbols) in a sequence. The number of bits used in this average cannot be too large, however, because that would cause an excessive transition time between modes (thus the channel may already have changed again). Too few bits used in an average may cause the adaptive rate image coder to unnecessarily switch compression modes. If the system is in a condition where channel coding is not used, then there will be no error corrections, and the BER must be estimated by a different method. The following will show how BER can be estimated from the signal constellations of BPSK, 4-PSK, and 16-QAM modulation schemes.

The demodulator slicer essentially selects, as a decision, the data symbol corresponding to the point in the signal constellation that is closest to a received sample. This is called optimal detection in a maximum likelihood (ML) sense as discussed in the text "Digital Communication" by Lee and Messerschmitt, Kluwer Academic Publishers, Boston, 1988. If $A_k$ is the transmitted sample and $Q_k$ is the received sample, the intuitive slicer (ML detector) selects the best estimate of the transmitted sample (denoted as $A_k'$) alphabet that minimizes $d^2=|Q_k-A_k'|^2$. The slicer selects the symbol in the alphabet that minimizes the Euclidean distance (d) to the received signal sample $Q_k$.

If the power of the signal component at the slicer is known, denoted as $E[|A_k|^2]$ (E is expected value operator), and the total noise power is also known, denoted as $2\sigma^2$, the SNR at the receiver can be shown to be: $SNR=E[|A_k|^2]/2\sigma^2$. Table 1 shows information on how BER would be computed based on the information presented above.

TABLE 1

| Constellation | BPSK | 4-PSK | 16-QAM |
|---|---|---|---|
| alphabet | {±a} | {±b, ±jb} | {(±c or ±3c) + j(±c or ±3c)} |
| min. dist. d | 2a | b√2 | 2c |

TABLE 1-continued

| Constellation | BPSK | 4-PSK | 16-QAM |
|---|---|---|---|
| power $E[|A_k|^2]$ | $a^2$ | $b^2$ | $10c^2$ |
| exact Pe | $Q(\sqrt{2SNR})$ | $2Q(\sqrt{SNR}) - Q^2(\sqrt{SNR})$ | $3Q(\sqrt{SNR/5}) - 2.25Q^2(\sqrt{SNR/5})$ |
| approximate Pe | $Q(\sqrt{2SNR})$ | $2Q(\sqrt{SNR})$ | $3Q(\sqrt{SNR/5})$ |
| rough Pe | $Q(\sqrt{2SNR})$ | $Q(\sqrt{SNR})$ | $Q(\sqrt{SNR/5})$ | where Q( ) is the well known complementary error function and $P_e$ is the probability of symbol error.

The probability that a symbol error occurs for a ML detector is equivalent to the probability that the received sample is closer to a symbol that is not the symbol that was sent. First, consider an alphabet having only two complex-valued symbols, namely $a_m$ and $a_n$. Assume the transmitted symbol at time k is $a_m$ and the received sample is $Q_k=a_m+Z_k$, where $Z_k$ is a complex-valued zero-mean Gaussian random variable with independent real and imaginary components, each of variance $\sigma^2$. The probability of a symbol error is simply the probability that $Q_k$ is closer to $a_n$ than $a_m$ and can be written as P[slicer prefers $a_n$ when $a_m$ was transmitted]. The slicer will prefer $a_n$ over $a_m$ (assuming $a_m$ was transmitted) if and only if:

$$|Q_k-a_n|^2<|Q_k-a_m|^2 \quad (1)$$

or since $Q_k=a_m+Z_k$, $$|a_m-a_n+Z_k|^2<|Z_k|^2 \quad (2)$$

which can be shown to be:

$$Re\{a_m-a_n\}Re\{Z_k\}+Im\{a_m-a_n\}Im\{Z_k\}<-d^2/2 \quad (3)$$

where $d=|a_m-a_n|$. Since the left side of eq.(3) is a linear combination of independent zero-mean Gaussian random variables, $Re\{Z_k\}$ and $Im\{Z_k\}$, each with variance $\sigma^2$, it can be found from the linear combination of Gaussian random variables that:

$$([Re\{a_m-a_n\}]^2+[Im\{a_m-a_n\}]^2)\sigma^2=d^2\sigma^2 \quad (4)$$

An error will then occur if a zero-mean Gaussian random variable with variance $d^2\sigma^2$ is less than $-d^2/2$, which is the same as the probability:

$$Q((d^2/2)/sqrt(d^2\sigma^2)))=Q(d/(2\sigma)) \quad (5)$$

where "Q( )" is the complementary error function. Equation (5) can be used to compute the probability of a symbol error for any of the constellations listed in Table 1. As a comparison, reference the relative SNR in each Pe equation of Table 1. Note that 4-PSK requires 3 dB more SNR than the binary antipodal signal to achieve the same probability of error. In comparing 16-QAM to 4-PSK, we will find that the 16-QAM signal requires 7 dB [10log(5)] more SNR than the 4-PSK signal, when using the "rough $P_e$" equations of Table 1. Note, however, that the 16-QAM signal carries twice as much data in the same bandwidth as the 4-PSK signal, so Pe vs. SNR should not be considered alone. Note that for digital systems $E_b/N_o$ (bit energy per noise spectral density) is often used as the signal to noise ratio parameter. $E_b/N_o$ is related to SNR by the following equation:

$$(E_b/N_o)R_b=S/N_o \quad (6)$$

[or $E_b/N_o=(S/N_o)/R_b$, where $(S/N)$ $(W/R_b)=(S/N_o)/R_b$ if $W=R_b$, W is the signal bandwidth] where $R_b$ is the data bit rate from the source encoder. It can also be shown that $E_s/N_o$ is related to SNR by:

$$(E_s/N_o)R_s = S/N_o \text{ [or } E_s/N_o = (S/N_o)/R_s] \quad (7)$$

where $R_s$ is the baud rate of the system after the modulator in symbol/sec. If channel coding is employed $E_{cb}/N_o$ (coded bit energy per noise spectral density) is related to SNR by the following equation:

$$(E_{cb}/N_o)R_{cb} = S/N_o \text{ [or } E_{cb}/N_o = (S/N_o)R_{cb}] \quad (8)$$

where $R_{cb}$ is the channel bit rate. If no channel coding is employed $R_s$ is related to $R_b$ by:

$$R_s = R_b/(\log_2(M)) \quad (9)$$

where $M = 2^N$ symbols in the modulation alphabet and N is the number of bits per symbol (N=1 for BPSK, N=2 for 4-PSK and N=4 for 16-QAM). If channel coding is employed the following relations are true:

$$R_{cb} = (n/k) * R_b \quad (10)$$

and $$R_s = R_{cb}/(\log 2(M)) = (n/k) * R_b/(\log 2(M)) \quad (11)$$

where n is the total number of message (or coded) bits and k is the number of data bits. The quantity (k/n) defines the rate of the error (channel) coding. $R_b$ is expanded (making it $R_{cb}$) by the factor of one over the code rate, (n/k).

When estimating the received SNR (or $E_b/N_o$), there will be a tradeoff between the length of time the measurement takes place and the accuracy of the measurement as it relates to the data block being considered. For example, the measurement duration, $T_{snr}$ will be correlated with the duration of the average fade in the channel, $T_{fade}$, in the following manner:

$$T_{snr} = w * T_{fade}, \quad (12)$$

where w is some constant determined by simulation or field testing to minimize the reconstructed image distortion. Alternatively, we may choose to use a measurement duration $T_{snr}$, which is correlated with the longest fade that is correctable via channel coding. Any fade longer than this time may cause excessive bit errors and thus would require a change based on the switching algorithm. The channel coding utilized will correct burst errors, similar to those caused by fading, and random errors due to additive white Gaussian noise.

Because this invention involves a feedback loop, any delays between the transmitter 101 and the receiver 103 must be taken into account to ensure the loop is stable under all circumstances. One type of delay that will carry a large range of values is the propagation delays between the transmitter and receiver. This delay is denoted as:

$$T_{plot} = T_{ptx} + T_{prcv}, \quad (13)$$

where $T_{ptx}$ and $T_{prcv}$ are the transmitter to receiver and receiver to transmitter propagation delays, respectively. Additionally, before any control signal can be sent back to the transmitter 101, the delay due to demodulation, SNR measurement and processing is also important to take into account. These other delays can be denoted as:

$$T_{proc} = T_{snr} + T_{dem} + T_{proc} \quad (14)$$

where $T_{snr}$ is as defined above and $T_{dem}$ and $T_{proc}$ are the delays used for the demodulation and all other signal processing (including channel state estimation) operations. A method to ensure loop stability would be to provide a guard band between bursts of the transmitter so that the transmitter receives the next control signal before the next burst. This guard time, $T_{guard}$, must then be greater than the sum of $T_{plot}$ and $T_{proc}$. This guard time may be set as a function of multiple bursts instead of every burst to improve transmission efficiency. It is clear that the processing time may vary depending on the symbol rate, other modem diversity parameters, and channel coding changes, but the largest variation is likely to be due to a large propagation distance between the transmitter and receiver. $T_{guard}$ can be set to be a function of the maximum expected distance or could be configured to be variable based on calibrated measurements between transmitter and receiver.

In FIG. 1, a communication system using an adaptive method for transmission of very high quality digitally compressed imagery is shown in block diagram form. The system of FIG. 1 includes a transmitter 101 and a receiver 103. A wireless communication link 105 couples the transmitter 101 to the receiver 103. Adaptive transmitter 101 includes image source 107, which may be a camera that takes a still image. Image coder 109, coupled to image source 107, codes a digital bit stream coming from image source 107 to reduce the amount of bandwidth that is required to transmit the image from the transmitter 101 to receiver 103. A channel coder 111 which may be of any conventional type, such as a forward error correcting coder which protects any of the bits in the image coder 109 which are deemed necessary to have good reconstruction at receiver 103. In a preferred embodiment, modulator 113 takes the channel coded information from channel coder 111, up samples, performs D/A conversion, and filters (not necessarily in that order) the information and delivers it to the antenna 102 which puts the analog signal in proper form for transmission via link 105. Antenna 102 provides coupling between transmitter 101 and the communications link 105. A channel status monitor 115 initializes the transmitter 101 at power up by providing initial state parameters to transmitter 101. Channel status monitor 115 is linked to image coder 109, channel coder 111 and modulator 113, to provide parameters that each of the blocks 109, 111 and 113 need to function at that particular instant.

Communications link 105 in this embodiment is a wireless, RF (radio frequency) path. As will be evident to those skilled in the art, link 105 is not limited to radio frequency links. Link 105 could, for example, be an optical link utilizing lasers.

Image source 107 can be a digital image source such as a data file containing digital image data. Image coder 109 receives the digital data representative of an image and codes the data in a way that allows data compression. In another embodiment of the invention, image coder 109 determines if the image data may be transmitted progressively.

Channel coder 111 takes the compressed data from image coder 109 and applies redundancy to the source information so that if errors occur in the communications link 105, the channel decoder 119 in receiver 103 can correct them. The amount of channel coding that is used is changed, depending on what the channel is doing.

Modulator 113 is chosen according to the type of modulation desired. The modulation may be changed and critical operating points of the system selected based on the modulation selected for use. Channel status monitor 115 is coupled to modulator 113 and can change the modulation rate and the transmit power. Image coder 109, channel coder 111, and modulator 113 are implemented in software in the illustrative embodiment of the invention, but in other embodiments may be implemented in hardware.

Modulator 113 of transmitter 101 includes a filter, a D/A converter, and an up converter coupled to antenna 102. Channel status monitor 115 receives signals from receiver 103 over the reverse channel in a full duplex link. Channel status monitor 115 receives information from receiver 103 on how the communication link 105 between the transmitter 101 and receiver 103 is changing and adjusts the transmit parameters accordingly to optimize the quality of the source information. The path between receiver 103 and channel status monitor 115 may be a wired or wireless channel.

Receiver 103 receives information via a communications link 105 established from antenna 102 of transmitter 101 to antenna 104 associated with receiver 103. The received signal is applied to a system state estimator 125 and a demodulator 117, which looks at that information. The system state estimator 125 estimates what the current operating parameters are that the transmitter has set for this particular time. System state estimator 125 inputs those parameters to a channel decoder 119 and image decoder 121. Demodulator 117 recovers the information according to the correct operating parameters and transfers the recovered information to channel decoder 119 and an image decoder 121. A data sink 123 reconstructs the image from the received information. Data sink 123 can be a data file or could also include a display monitor or other hardware or software which utilizes image data. Channel decoder 119 and image decoder 121 together perform the reverse process of the equivalent blocks 109, 111 in transmitter 101.

In order for demodulator 117, channel decoder 119, and image decoder 121 to operate correctly they must be programmed with appropriate parameters. The system state estimator 125 serves to decode that information.

Channel status estimator 127 takes performance information from image decoder 121, channel decoder 119 and demodulator 117. Channel status estimator 127 looks at, for example, reconstructed peak signal to noise ratio (PSNR) of the image decoder 121, bit error rate out of the channel decoder 119, symbol error rate (SEP) and the signal quality or signal to noise ratio (SNR) out of the demodulator 117. Channel status estimator 127 uses all that information and the evolving channel condition stored in a memory (which is not shown). If there is some correlation involved, channel status estimator 127 stores the information in memory and determines from the PSNR, channel decoder BER, demodulator BER, and/or estimated demodulated SNR to decide and calculate any necessary to change transmit parameters to better improve the image quality at the receiver.

Figure 2:
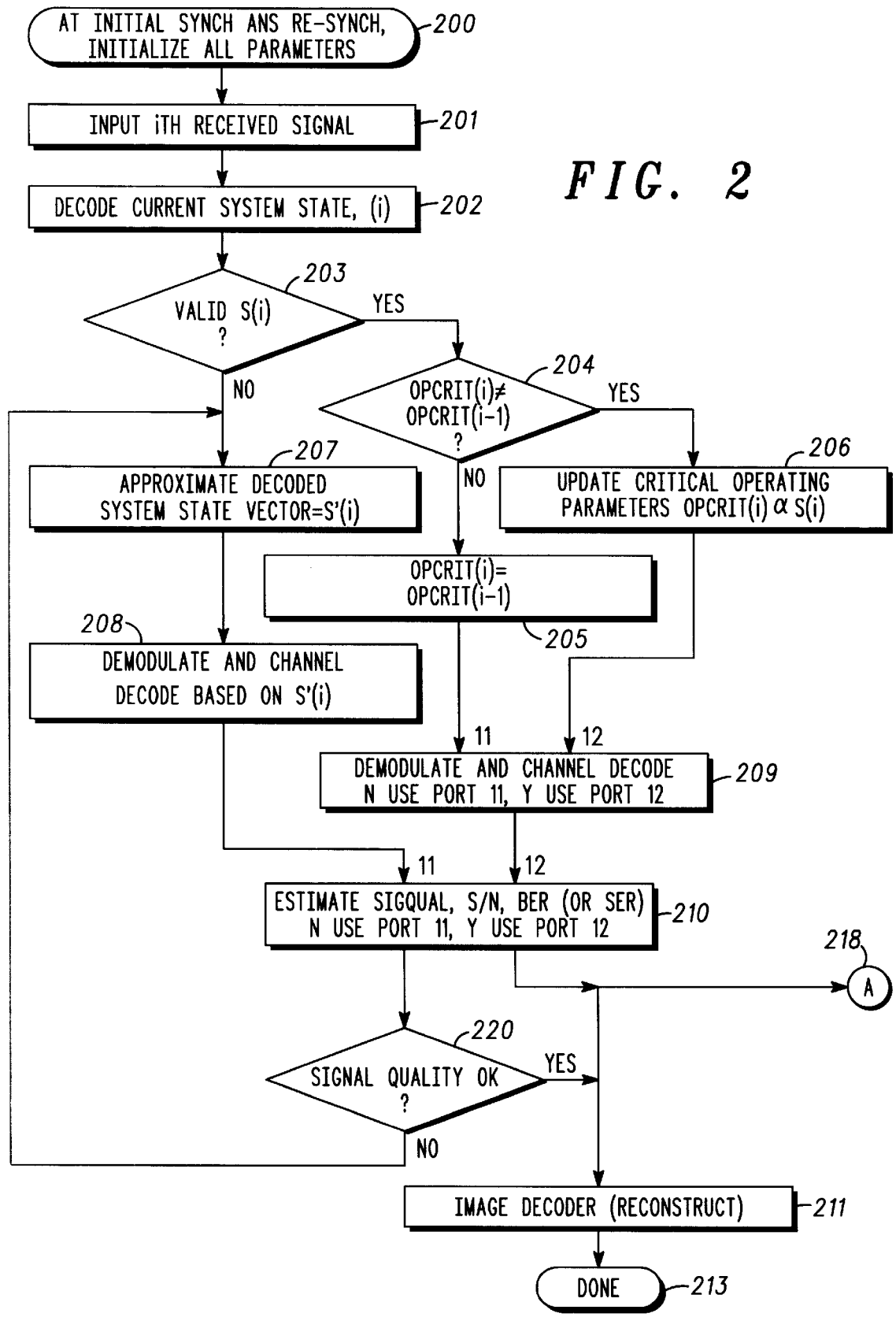
FIG. 2 is a flow diagram of a portion of a method for reception of very high quality digitally compressed imagery in accordance with the principles of the invention.

Turning now to FIG. 2, operation of the receiver 103 will be described. At initial synchronization of the system or during power up, the system initializes all of the parameters at step 200. At step 201, the $i^{th}$ received input signal from the communications link 105 is received. At step 202, the current system state, S(i) is decoded. The $i^{th}$ signal may be multiple data bits/bytes and will depend on how the image is coded and the RF carrier access scheme. System state estimator 125 provides the system state decode called for in step 202. At step 203, a determination is made as to whether the decoded current system state S(i) is valid. If S(i) is not valid, the decoded system state vector is approximated at step 207. When approximating the state vector, it is approximated to be the same as in the immediate prior state vector if it is determined to be closest in hamming distance to the actual decoded state vector S(i) in step 202. Otherwise, the next closest valid state vector, in terms of hamming distance relative to S(i), from step 202 is used. Demodulation and channel decoding based on that approximation occurs at step 208. In step 210, the signal quality, SNR, BER, and SER are estimated.

Now if at step 203, the system state S(i) is determined to be a valid system state, the operating parameters for this received frame are checked to determine whether they are the same as the previous operating parameters or whether they are changed at step 204. If the operating parameters are the same, then the prior operating parameters are utilized as indicated at step 209. If the operating parameters are not the same, the operating parameters are updated based on what S(i) is at step 206.

From steps 205 and 206, demodulation and channel decoding occurs at step 209 and then at step 210 the signal quality, SNR, and BER, or SER are estimated.

After step 210, the signal quality is checked at step 220. If the signal quality is "ok" based upon the approximated decoded system state vector, the image decoder 121 reconstructs the image as indicated at step 211 and thence to step 213 when the reconstruction is complete. From step 220, the process further advances to flow connector 218 which connects with connector 314 of the flow diagram of FIG. 3. If the signal quality is not "ok" as determined at step 220, then the process branches back to step 207 and approximates to the next most probable decoded system state vector.

At the time that the image is reconstructed at step 211, the process also advances to connector 314 so that the current channel condition can be estimated.

Figure 3:
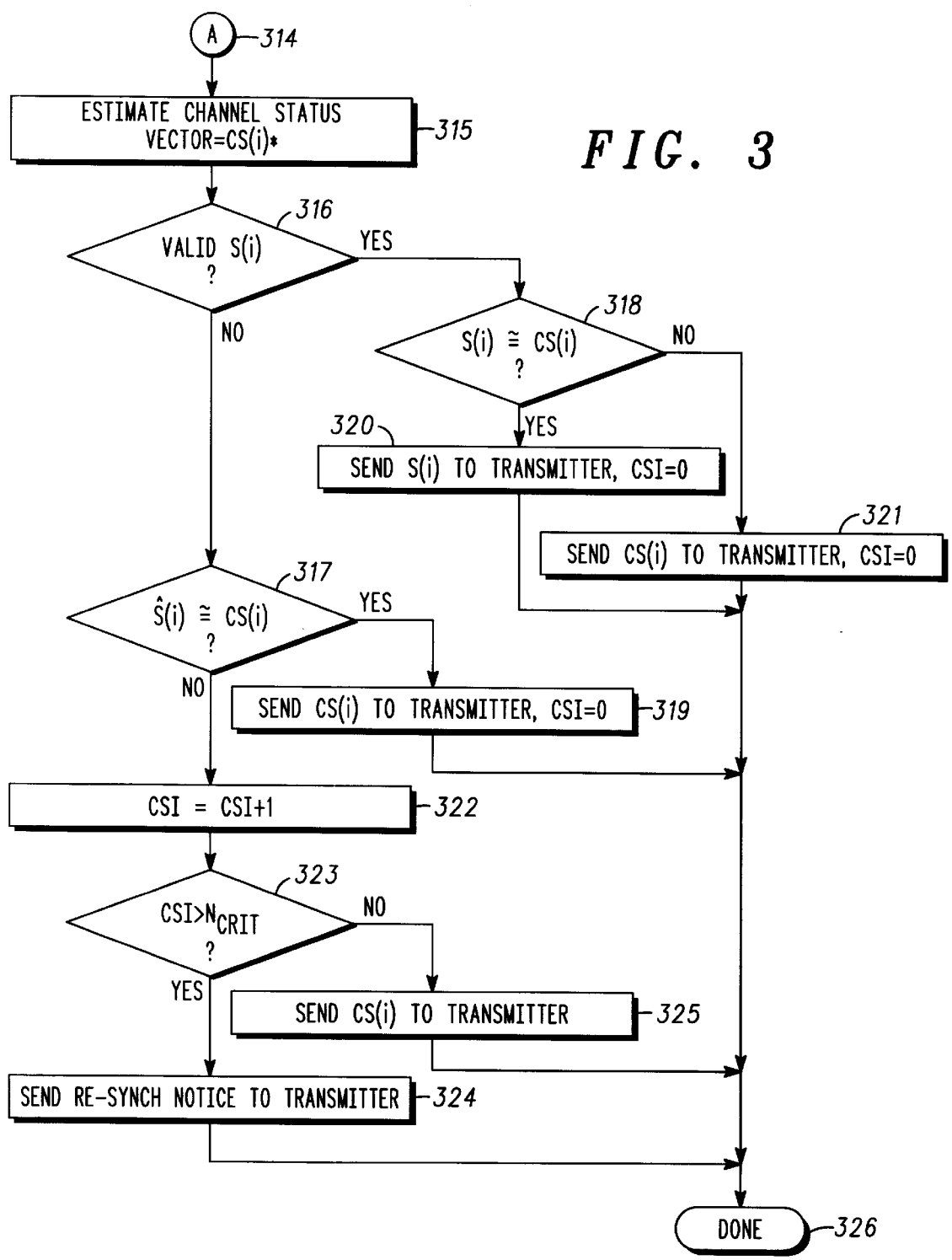
FIG. 3 is a flow diagram of a second portion of the method of FIG. 2.

FIG. 3 illustrates estimation of the channel status vector CS(i). At step 315, CS(i) is estimated based on the switching algorithm of FIGS. 5 through 9.

After the channel status vector is estimated, the system state S(i) is checked for validity at step 316. If the current system state is valid, the system determines whether the channel status vector CS(i) is in proportion to the current system state S(i) at step 318. If it is, then S(i) is sent to the transmitter 101 and a counter CSI is set to zero at step 320.

If S(i) is not approximately equal to CS(i) at step 318, CS(i) is sent to transmitter 101 at step 321 because that means the channel status has changed. In addition, counter CSI is set to zero and sent to transmitter 101.

Going back to step 317, if the estimated S(i) (i.e., S'(i)) is approximately related to CS(i) then CS(i) is sent to transmitter 101 at step 319. In addition counter CSI is set to 0. If S(i) is not approximately related to CS(i), then counter CSI is incremented at step 322. At step 323 if the count of counter CSI is greater than some critical value $N_{crit}$ a re-synchronization notice is sent to transmitter 101 at step 324. If counter CSI is not greater than the critical value, CS(i) is sent to transmitter 101 at step 325.

Figure 4:
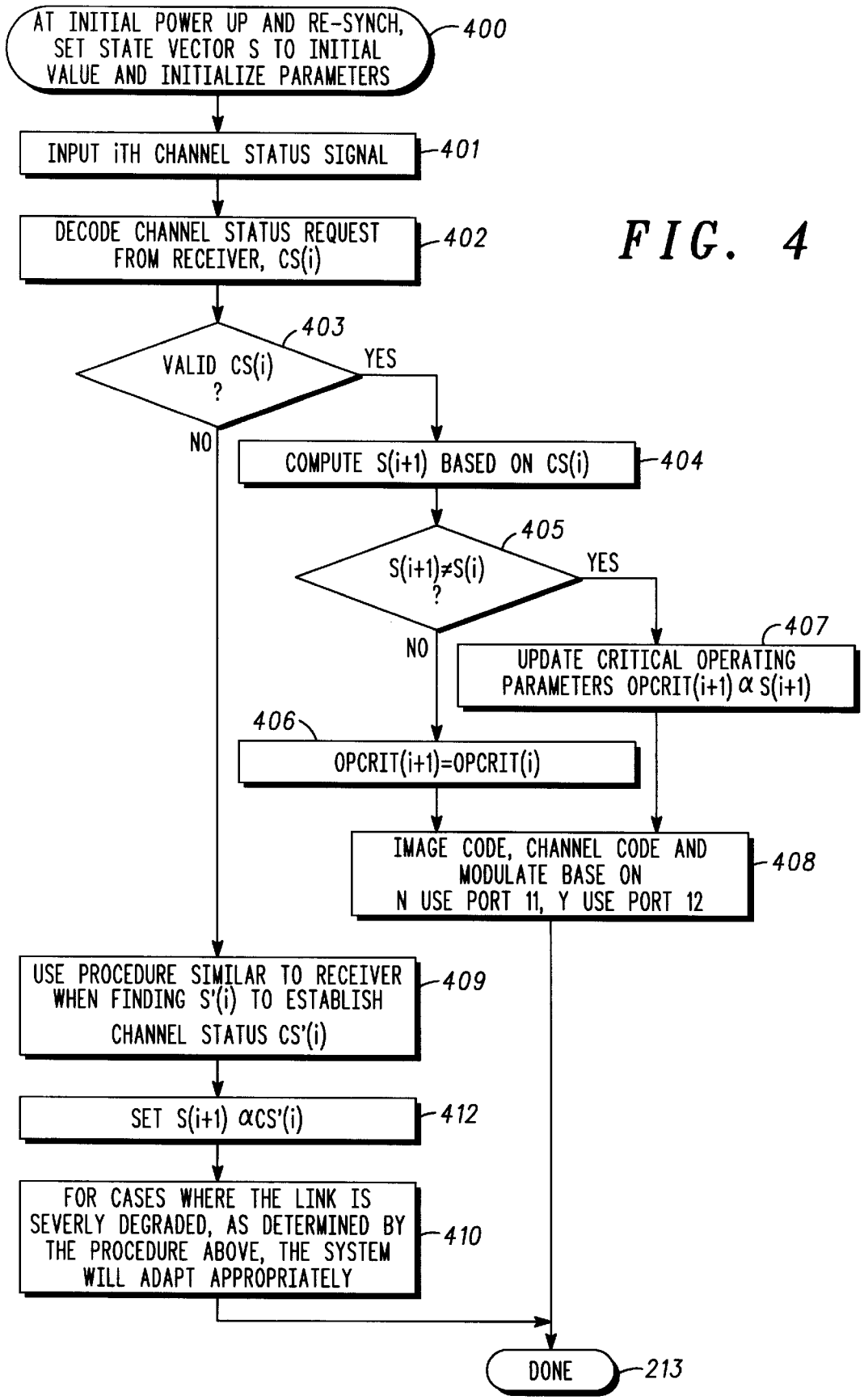
FIG. 4 is a flow diagram of a method of transmission of very high quality digitally compressed imagery in accordance with the principles of the invention.

Turning to FIG. 4, a flow diagram of an algorithm in the channel status monitor 115 of transmitter 101 is described. At step 400, the transmitter 101 is initially powered up and initialization occurs setting state vector S to an initial value. At step 401, the $i^{th}$ channel status signal is inputted. The channel status indicator is checked at step 403 to determine if it is valid. If CS(i) is not valid, an estimated channel status vector CS'(i) is generated at step 409. If CS(i) is valid as determined at step 403, the next system state vector S(i+1) is computed based on CS(i) at step 404. At step 405, the new state vector S(i+1) is compared to the prior state vector S(i) to determine if they are equal. If they are equal, the same operating conditions are maintained as indicated at step 406. If the new state vector is not equal to the prior state vector, critical operating data is updated at step 407 based on the system state vector S(i+1) computed at step 404.

From steps 406 and 409, the image code, channel code and modulation is determined.

Returning to step 403, if CS(i) is not valid, a procedure similar to that used in the receiver 103 to estimate the channel status vector is used at step 409. At step 412, the system state vector S(i+1) is set to be proportional to the channel status vector. At step 410, where the communications link is severely degraded as determined in the prior steps, the system adapts to the degradation by following predetermined adaptive processes.

The adaptive process may use information that the receiver portion of the transceiver has as signal quality parameters to maximize signal quality.

Figure 5:
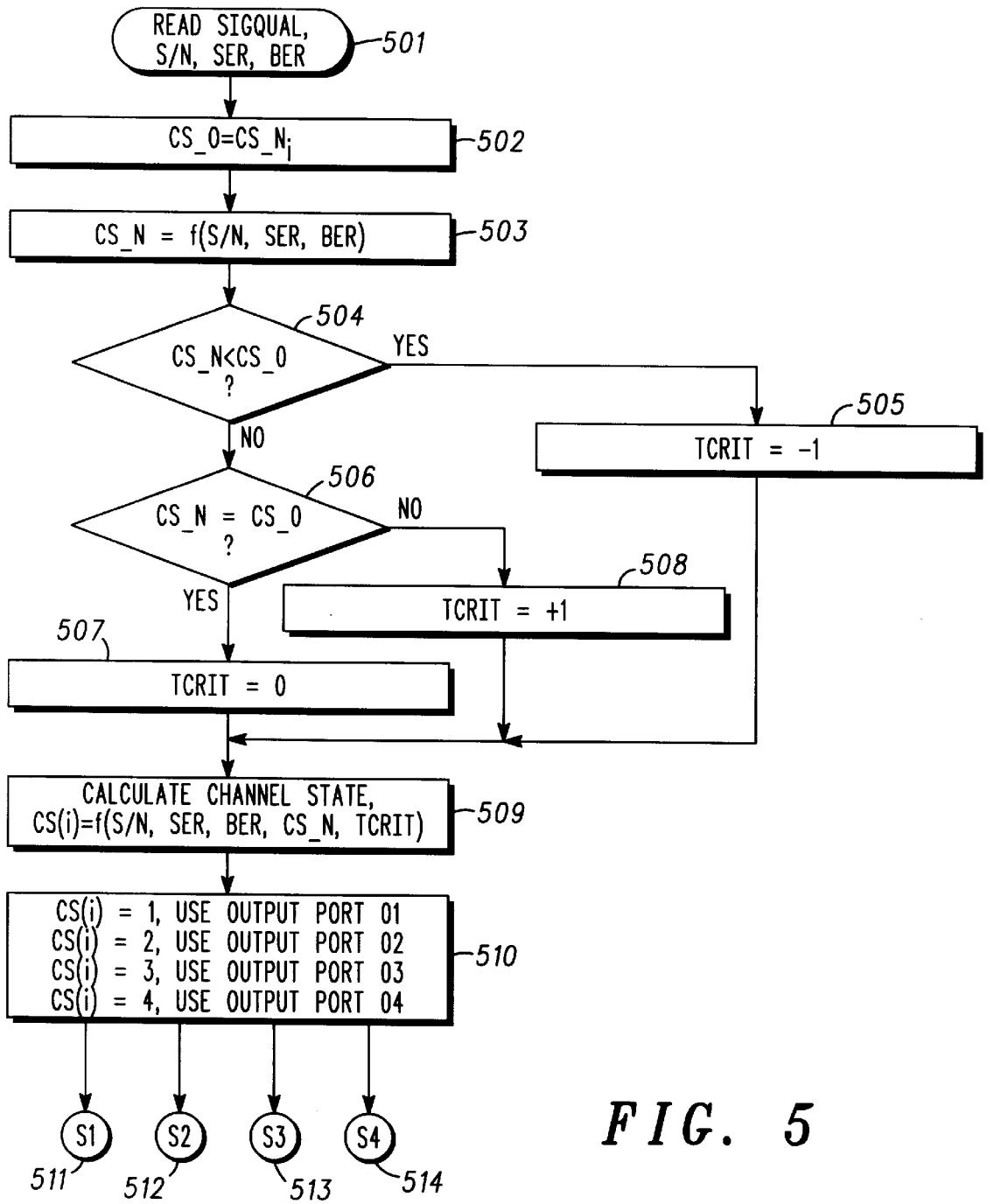
FIG. 5 is a flow diagram of a first portion of a receive switching algorithm in accordance with the present invention.

A further part of the switching algorithm for the receiver is shown in flow diagram form in FIG. 5. At step 501 the signal quality (such as PSNR), SNR, SER, and BER are read. The channel status CS(i) is set such that the old channel status CS_O is set equal to the new channel state estimate CS_N. Note that CS_N will be at a default value at power up and initialization. At initialization CS_N is defined for nominal channel condition or at a predetermined starting value determined by field measurements. At step 503, channel status is calculated based on a function of the quality parameters identified at step 501. At step 504, a determination is made as to whether the channel state is better or worse than the old. If the channel state is worse, the process branches to step 505 and the time parameter identified as $T_{crit}$, which is the time parameter that is used to figure out how long the channel has been bad, is decremented. If the channel state is better, the new channel status is incremented at step 508. If the channel state is unchanged, $T_{crit}$ is set to zero at step 507. From steps 505, 507 and 508 the process advances to step 509 at which the channel status is calculated. The channel status may in the illustrative embodiment have one of four values. The higher the channel status number, the better quality of signal that it emits or the better state that the channel is in. At step 510, the channel status is looked at. Based upon the channel status number, one of four connections 511, 512, 513 or 514 is selected. Connection 511 corresponds to very bad channel status, 512 corresponds to bad, 513 corresponds to a nominal channel; and connection 514 means that it's very good.

Figure 6:
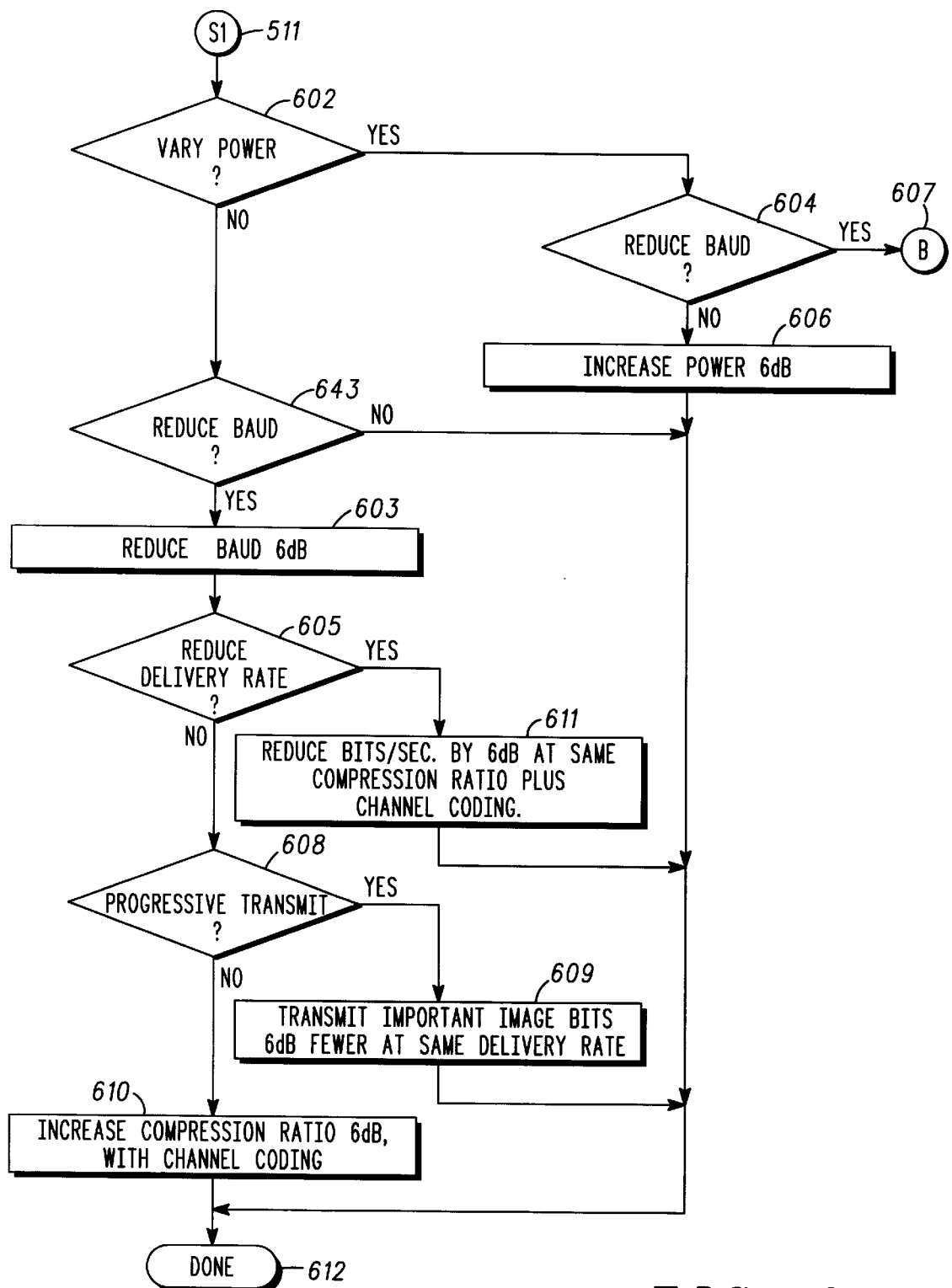
FIG. 6 is a flow diagram of a second portion of the receive switching algorithm of FIG. 5 for a first channel state.

If the channel status is determined to be very bad, the process continues as shown in FIG. 6. The process of FIG. 6 is entered via connector 511.

It should be noted that the specifications for each channel state in FIGS. 6–10 are representative of an adaptive system capable of only incremental changes, such as 6 dB, 3 dB, 1.5 dB, etc. It is important to state that the system of the present invention is capable of many discrete changes in power levels, baud rate, channel code rate, compression rates, delivery rate, progressive transmission strategies, and others. The flowcharts illustrate a preferred embodiment, using a limited number of discrete changes, which produces significant quality enhancements with little additional complexity compared to a fixed rate system.

There are a number of possibilities of what can be done if the channel is in a "very bad" state. The first possibility is step 602 in which it is determined if the option of varying transmit power is available as an option. If varying the power is an option, then at step 604 a determination is made as to whether it is desirable to reduce the baud rate. If it is desirable to reduce the baud rate, then the process will branch to connector 607. If it is determined that it is not desirable to reduce the baud rate, then the power will be increased by 6 db at step 606. If it is not possible to raise the power at step 602, then a determination is made at step 643 as to whether the baud rate should be reduced. If the baud rate is not to be reduced then the algorithm is complete. If it is determined at step 643 to reduce the baud rate, the baud rate is reduced by 6 db at step 603. The transmission rate may also be varied at step 603. After reducing the baud rate at step 603, the next step is to determine whether the delivery rate should be reduced as shown at step 605.

The delivery rate, for example, indicates how many images are delivered per unit time. If it is determined not to reduce the delivery rate, then at step 608 a determination is made as to whether to use progressive image transmission. If in step 608 it is determined to use progressive transmission, a progressive transmission process is employed as indicated at step 609. If progressive transmission is not to be used, the compression ratio is increased by 6 dB as indicated in step 610. If at step 605 it is determined to reduce the delivery rate, the system reduces the delivery rate at step 611.

Figure 7:
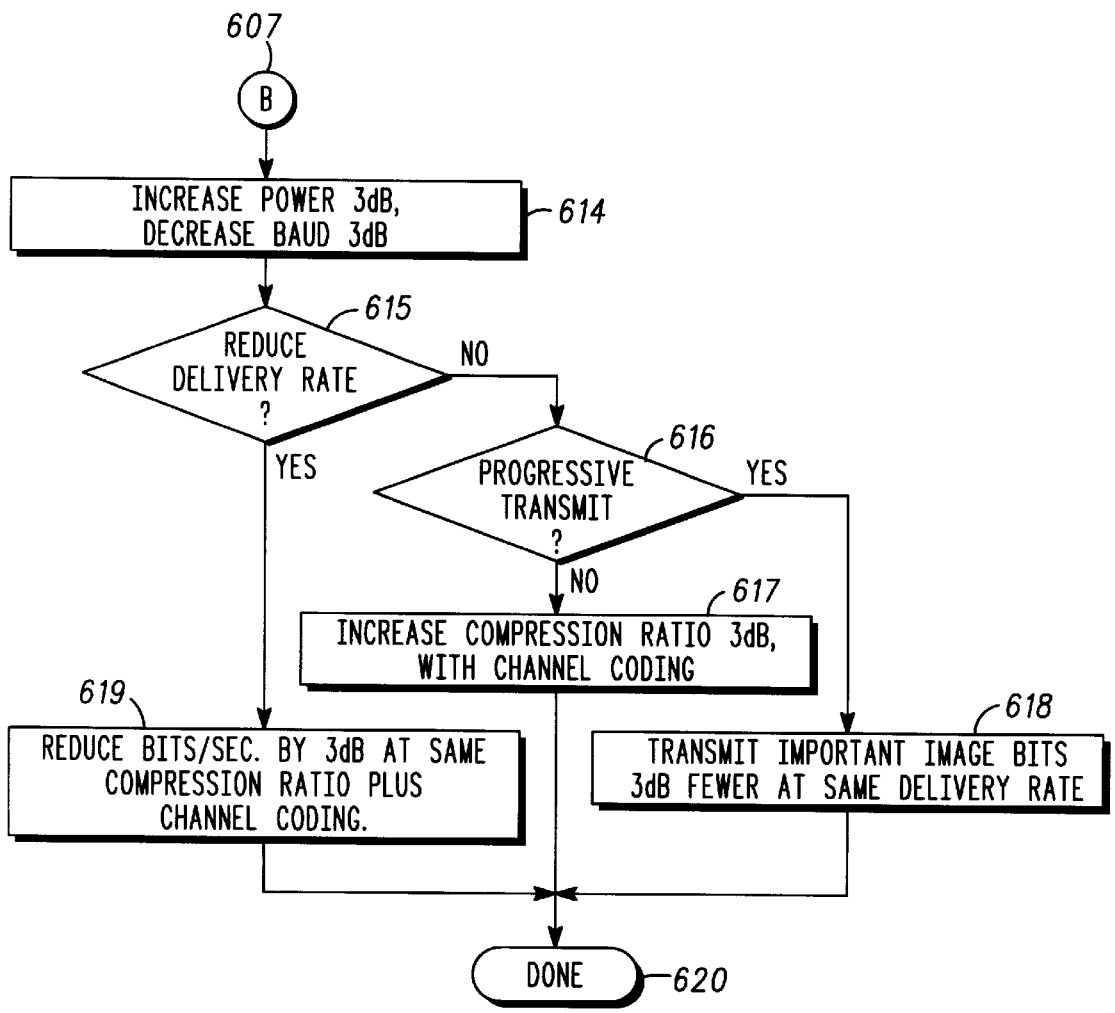
FIG. 7 is a continuation of the flow diagram of FIG. 6.

Turning now to FIG. 7, the operational flow from connector 607 of FIG. 6 is described. To reach this point, decisions were made to vary the power at step 602 and to reduce the baud rate at step 604. At step 614, the power is increased by 3 dB and the baud rate decreased by 3 db. A determination is then made at step 615 as to whether the delivery rate should be reduced. If it is decided to reduce the delivery rate, then at step 619 the delivery rate is reduced while maintaining the same compression ratio and channel coding, after which this portion of the operation is complete as indicated at step 620. If at step 615, it is decided to not reduce the delivery rate, at step 616 a determination is made as to whether to utilize progressive transmission. If it is determined to do so, then at step 618, progressive transmission of the image data occurs, after which the operation is complete at step 620. If, on the other hand, it is determined to not utilize progressive transmission, the compression ratio is increased as indicated at step 617 while maintaining the same channel coding.

Figure 8:
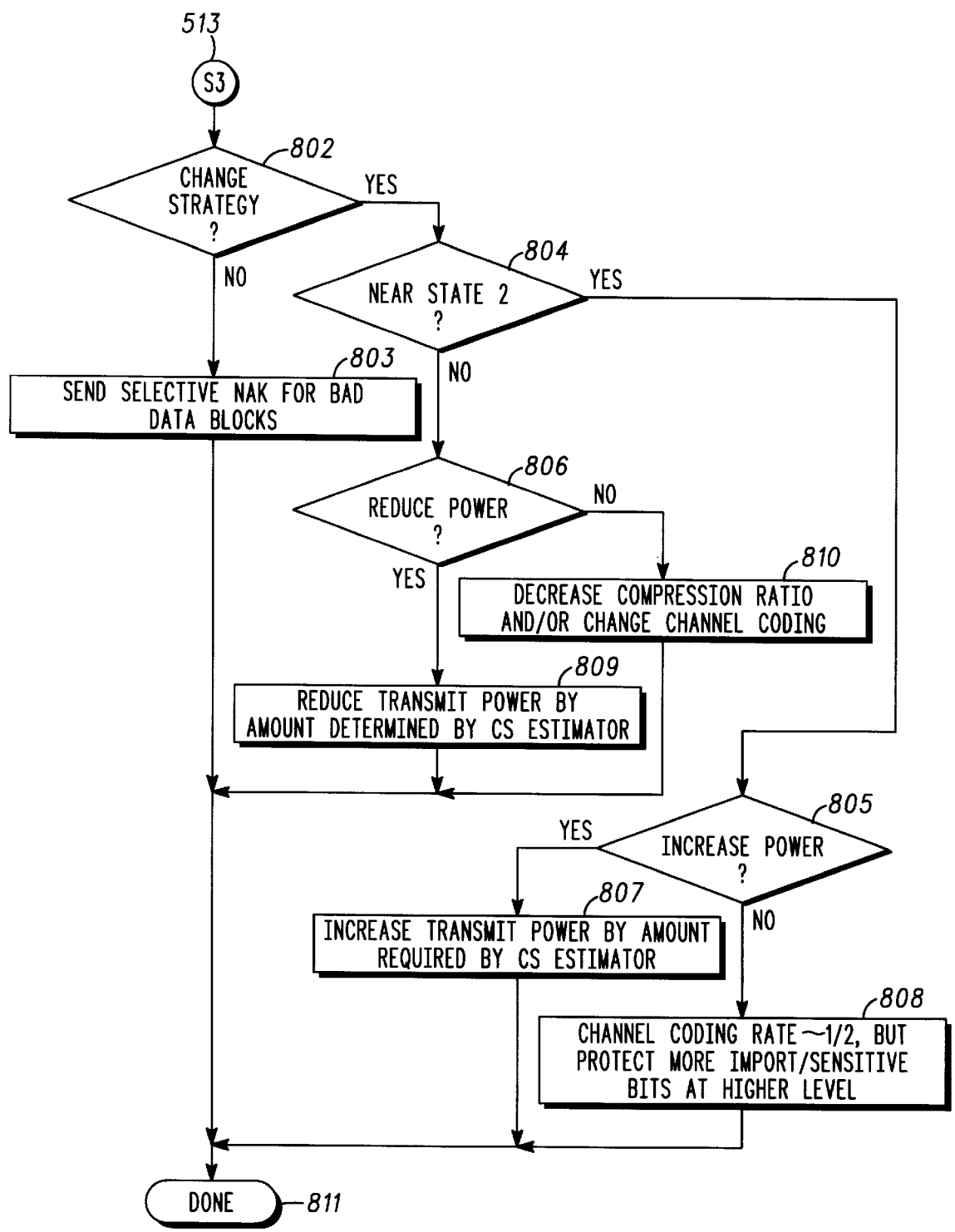
FIG. 8 is a flow diagram of a portion of a receive switching algorithm for a third channel state in accordance with the present invention.

In FIG. 5, if the channel is in channel state 2 (i.e., bad), the flow diagram is identical to that of FIGS. 6 and 7, except that all of the numbers in dB are cut in half. In FIG. 5, if the channel is "ok" (i.e., a nominal channel), the process goes to connector 513. In FIG. 8, connector 513 leads to step 802. At step 802, a decision is made as to whether or not to change the operational strategy for the system. If it is decided not to change the strategy, a selective negative acknowledgment for any bad data blocks is sent at step 803, but only if the delivery rate is within the guaranteed delivery rate. This operation is then complete as indicated at step 811.

If at step 802 it is determined that the strategy is to change, a decision is made at step 804 as to whether or not the channel state is close to being at state 2 as indicated at step 510 of FIG. 5. If it is determined that the channel state is not near state 2, the channel is probably better than nominal and at step 806 a decision is made as to whether the power can be reduced. If the power can be reduced, than at step 809, the transmit power is reduced by an amount determined by the channel state estimator 127 shown in FIG. 1 in accordance with the method shown in the flow diagram of FIG. 9. If the power is not to be reduced, the compression ratio is changed and/or the channel coding is changed as indicted at step 810.

If at step 804 it is determined that the channel state is near state 2, the channel is probably slightly worse than nominal, but it's not bad yet. Accordingly, a determination is made at step 805 whether or not to increase power. If it is determined that the power can be increased, the power is increased at step 807 by an amount determined by channel status estimator 127. If however, it is determined at step 805 not to increase power, that indicates that it is possible to protect the image data so that it can withstand a slightly higher bit error rate, BER, and that the channel coding strategy may be changed so as to protect the more important bits of the image data so that the image does not appreciably degrade in a perceptible manner as indicted at step 808. Then the operation is done as indicated at step 811.

Figure 9:
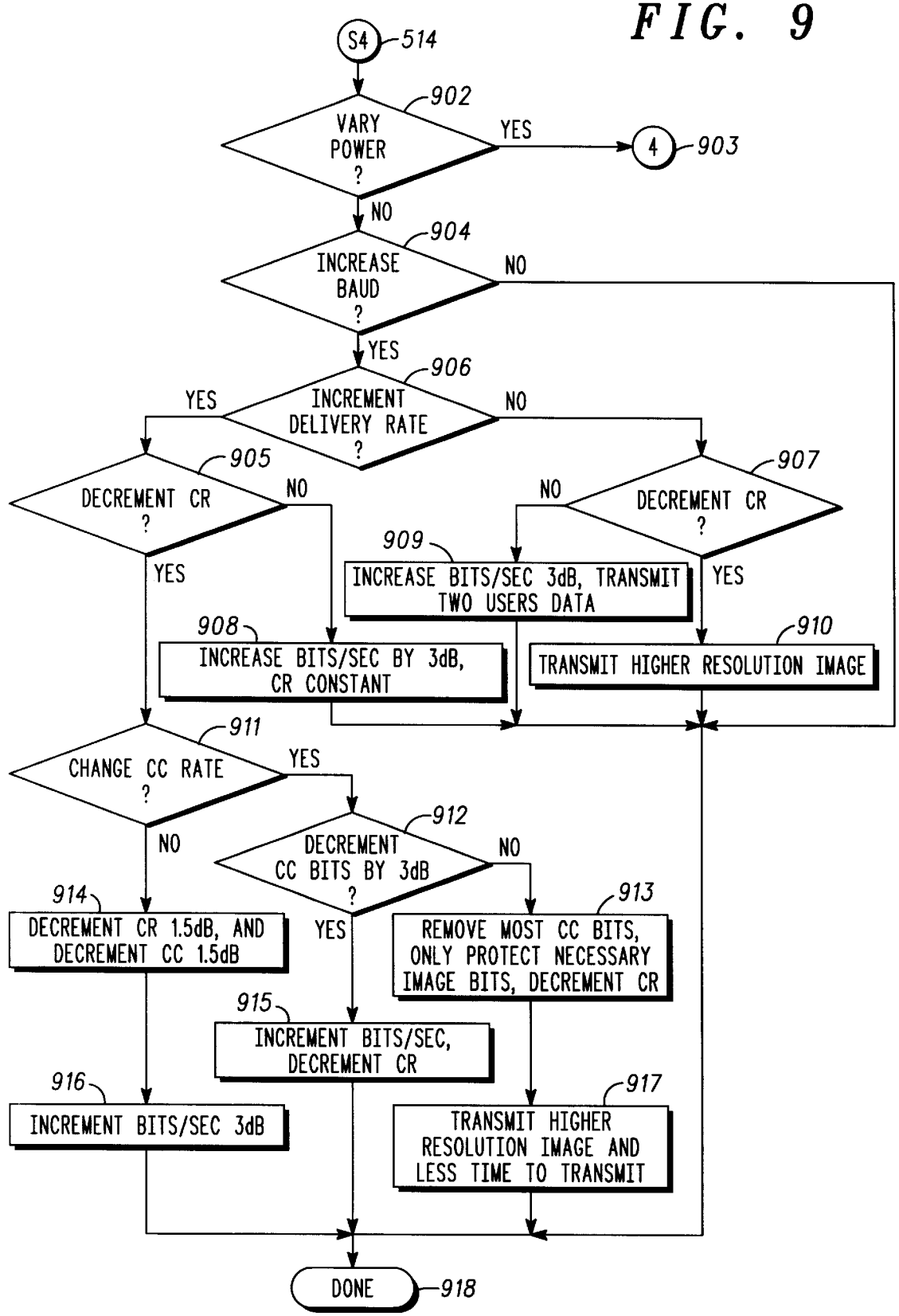
FIG. 9 is a flow diagram of a first portion of a receive switching algorithm for a fourth channel state in accordance with the present invention.

If the channel is identified as being in state 4 which corresponds to being of very good quality in the process of FIG. 5, as indicated at 514, the process continues as shown in the flow diagram of FIG. 9. At step 902, a decision is made as to whether to vary the transmit power. If the power can be varied, the process branches to connector 903 and to the process shown in the flow diagram of FIG. 10, which is described below. If the power can not be varied, a decision is then made at step 904 as to whether the baud rate may be increased. If the baud rate can not be increased, then this portion of the process is done as indicated at step 918. If the baud rate can be increased, then a further decision is made as to whether the delivery rate can be increased at step 906. If the delivery rate can not be increased, then a decision is made as to whether the compression ratio can be decreased as indicated at step 907. If the compression ratio can not be decreased, the number of bits per second is increased by 3 dB as indicated at step 909 and the process is complete as indicated at step 918. If the compression ratio can be decreased, then it is decreased and a higher resolution image is transmitted as indicated at step 910 and the process is complete at step 918.

If at step 906, it is determined that the delivery rate may be increased, then it is further determined at step 905 whether the compression ratio may be decreased. If it can not, the bit rate is increased by 3 dB while holding the compression ratio constant, thereby causing the image delivery rate to double, as indicated in step 908 and the process is complete as indicated at step 918. If at step 905 it is determined that the compression ratio can be decreased, a determination is made as to whether or not the channel coding rate can be changed at step 911. If it can, a further decision is made at step 912 as to whether or not the channel bits can be decreased by 3 dB. If not, at step 913 most channel coding bits are removed at step 913 only protecting the necessary most sensitive image bits. Then a higher resolution image is transmitted at step 917. The higher resolution image takes less time to be transmitted.

If at step 912 it is determined that the compression ratio bits can be changed by 3 db, the number of bits per second is increased and the compression ratio is decreased at step 915. There is thus less error protection, but there are fewer errors on a channel. By increasing the number of bits per second, and decreasing the compression ratio, there are more image bits (i.e., higher resolution image) and it takes less time to transmit the image.

If at step 911 it is determined that the channel coding rate can not be changed, the compression ratio is decreased by 1.5 dB and the channel coding bit rate is also decreased by 1.5 dB (which holds the channel coding rate n/k constant) at step 914. At step 916, the bits per second is increased by 3 dB so it takes half as long to transmit the image. The process is thus complete at step 918.

Figure 10:
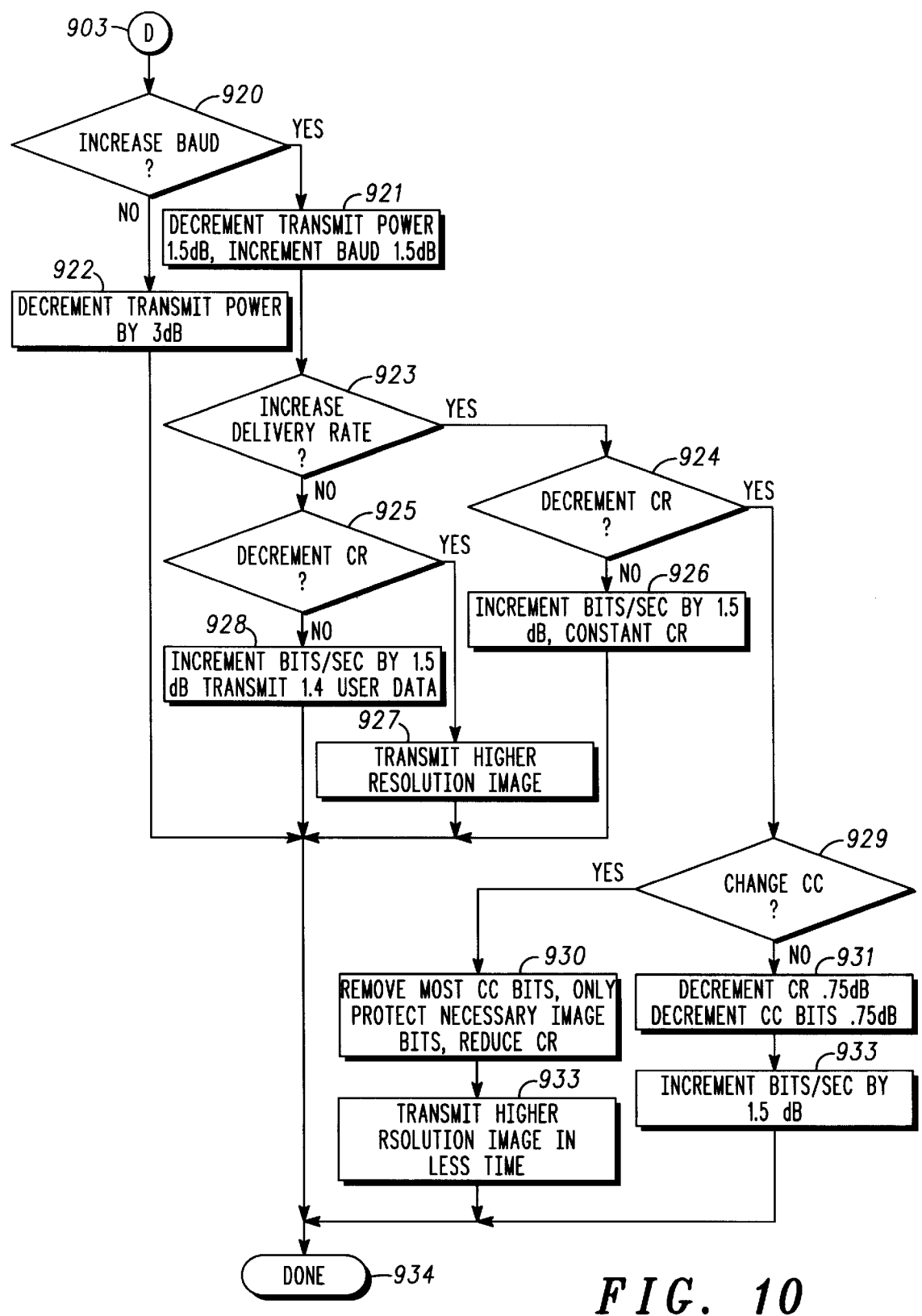
FIG. 10 is a flow diagram of a second portion of the receive switching algorithm of FIG. 9 for the fourth channel state in accordance with the present invention.

If at step 902 it is determined that the power can be varied, the process is connected to step 920 at FIG. 10. At step 920, a determination is made as to whether the baud rate can be increased. If not, the transmit power is decreased by 3 db at step 922 and the process is complete at step 934. If at step 920 it is determined that the baud rate can be increased, the transmit power is decreased by 1.5 dB and the baud rate is increased by 1.5 dB at step 921. Then, a decision is made as to whether the delivery rate can be increased at step 923. If the delivery rate can not be increased, then a determination is made as to whether the compression ratio can be decreased at step 925. If the compression ratio can be decreased, a higher resolution image is transmitted as indicated at step 927 and the process is done as indicated at step 934. If the compression ratio can not be decreased, the bit rate is increased by 1.5 dB and the amount of user data transmitted is increased as indicated at step 928.

If at step 923 it is determined that the delivery rate can be increased, a decision is made as to whether or not the compression ratio can be decreased as indicated at step 924. If the compression ratio can not be decreased, the number of bits per second is increased 1.5 dB and the compression ratio is maintained constant as indicated at step 926 and again the process is done as indicated by step 934. This allows the image to be transmitted in less time.

If the compression ratio can be decreased, then a determination is made at step 929 if channel coding can be changed. If not, the compression ratio is decreased by 0.75 dB and the channel coding bit rate will correspondingly decrease by 0.75 dB as indicated at step 931. Note that the channel coding strategy will still be the same (i.e., same ratio of channel coded bits to information bits). The bit rate is increased at step 933 by 1.5 dB and it takes somewhat less time to transmit that image. If the channel coding can be changed, then channel coding bits are removed at step 930 only protecting the necessary image bits and the image compression ratio is reduced. Thus, as indicated in step 932, a higher resolution image is transmitted in less time.

It should be noted that in the drawing figures where a block indicates "Change CC" that means "Change Channel Coding." If its a "No", that means the bit rate of channel coding is changeable but the information bits are protected in the same fashion.

Figure 13:
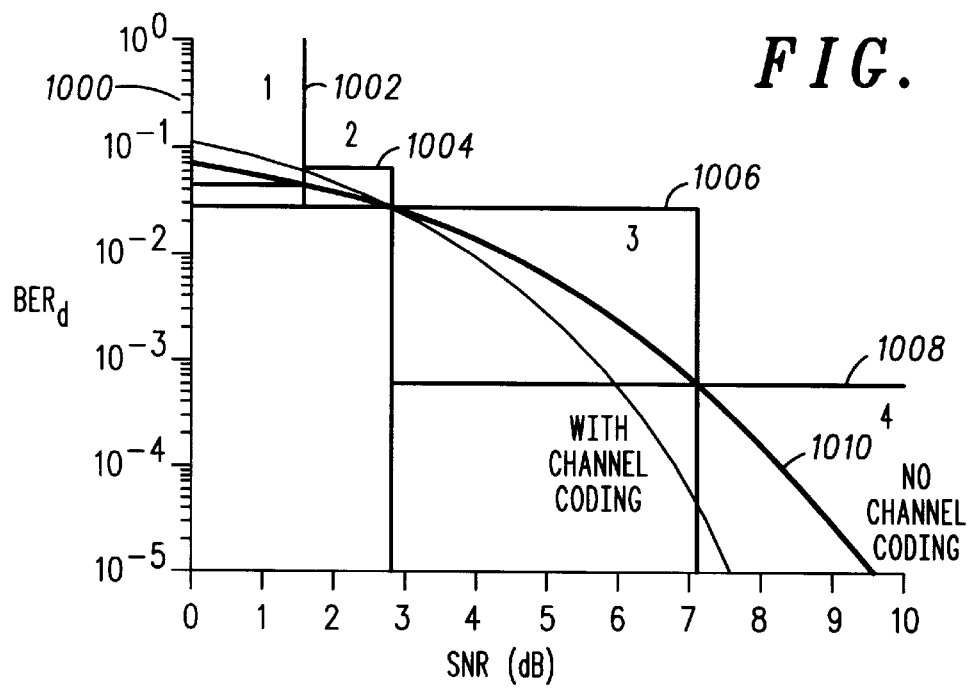
FIG. 13 is a plot of BER vs. SNR for BPSK modulation for the system of FIG. 1.

The nominal operating condition for the system will be determined partially by the modulation performance curves and additionally by the bit error sensitivities of the image coder 109. If we assume that the image coder/decoder suffers little or no degradation if the bit error rate is less than approximately $10^{-3}$, then we can set the nominal operating condition for the system around this bit error rate. If the received SNR drops below this value corresponding to a $3(10^{-2})$ BER, then we may wish to provide channel coding either in a higher sense or with a different strategy. This corresponds to region 3 of FIG. 13. If our received SNR is high, our strategy may be to decrease compression ratio or increase the image delivery rate, which may correspond to region 4 of FIG. 13. As our BER increases, as if moving from region 3 to region 2 or even region 1, our switching strategy may be to reduce baud rate, increase power, reduce delivery rate, etc., depending on the channel status at the moment. In any case, FIG. 13 shows the advantage which is provided by channel coding, where this advantage occurs, and where channel coding is of no use in terms of BER. Essentially, the graph is an indicator of what state the channel is in and what the corresponding switching strategy would be.

The method of the invention minimizes the overall distortion for the received image. As mentioned previously, there are two main sources which will cause the degradation in the received image. One is the source encoding rate or the number of bits per image pixel (compression ratio) and the second is the distortion after decoding due to channel bit errors. As was also stated above, one method to reduce channel bit errors is to more properly align the modulation symbol rate with the available channel capacity, which will reduce the bit error rate (BER). This, however, means that we must reduce the number of bits per image pixel, assuming constant image delivery rate. We can then perform the tradeoff between an increase in distortion of the image due to a lower encoding rate with a reduction in image distortion due to a decrease in modem symbol rate (decrease in the BER).

Figure 14:
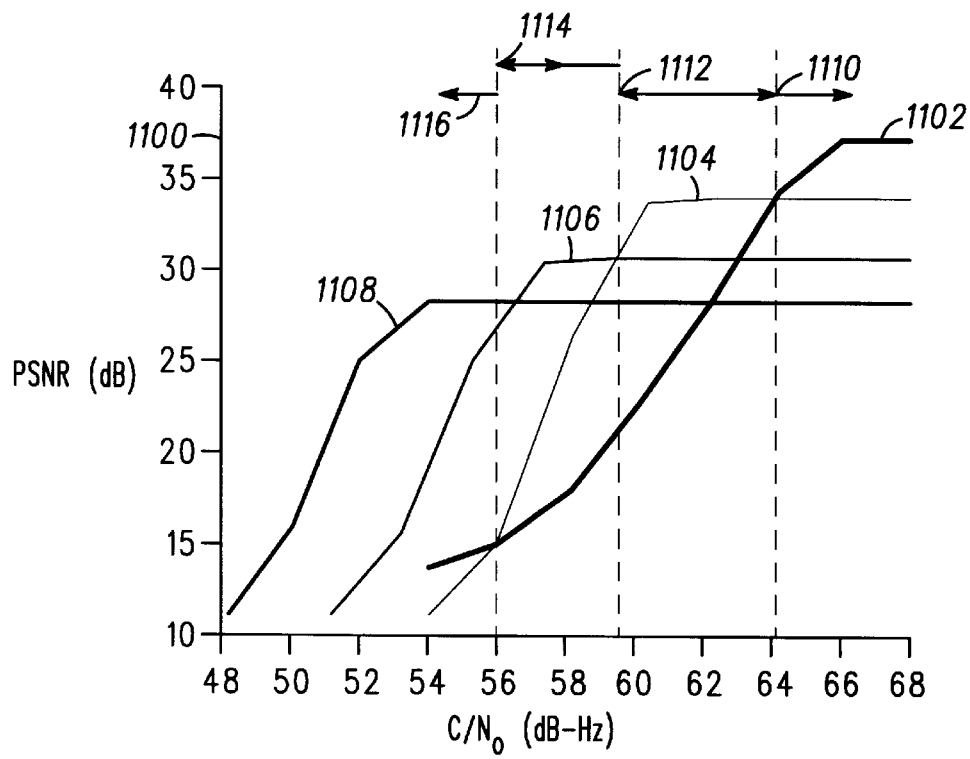
FIG. 14 is a plot of PSNR vs. $C/N_o$ for the system of FIG. 1.

An example of this method is illustrated in FIG. 14. From FIG. 14, we have used an image coder with a differentially coherent 4PSK modulation (D4PSK) with an adaptive symbol rate modem operating over a 20 dB-Hz range in average received power (C) to noise spectral density ($N_o$), (i.e., $C/N_o$), in an additive white Gaussian noise channel. FIG. 14 shows four curves 1102, 1104, 1106, and 1108, each corresponding to a different system configuration, as shown in Table 2.

TABLE 2

| | Curve 1102 | Curve 1104 | Curve 1106 | Curve 1108 |
|---|---|---|---|---|
| Image Coding | 1 bpp | .5 bpp | .25 bpp | .125 bpp |
| Channel Coding | none | half-rate convolutional | half-rate convolutional | half-rate convolutional |
| Baud Rate | 131 ksym/s | 131 ksym/s | 65.5 ksym/s | 32.75 ksym/s | where bpp represents bits per pixel and ksym/s represents kilosymbols per second. The distortion measure for this illustration is PSNR of the image coder. In this situation, we measure the PSNR of the image coder versus $C/N_o$. It is obvious that at high $C/N_o$ values, the maximum PSNR is achieved by utilizing the higher bit rate image coder at 1 bit/pixel (higher source encoding rate). However, as $C/N_o$ drops, we must drop the modem symbol rate (thus a corresponding drop in the image coder bit rate) in order to maximize the PSNR. For example, when $C/N_o$ is below approximately 56 dB-Hz, the 0.125 bit/pixel image coder with a 32.75 modem symbol rate and half rate channel coding provides the system with the highest PSNR.

Embedded source coding approaches, while typically less complex than multi-mode source coding, may not provide sufficient coding gains necessary under certain channel conditions. For this technique, multi-mode source encoding may be utilized, however, it is also directly applicable when embedded source encoding is required. As the channel degrades to a point where it causes severe distortion in the reconstructed image (i.e., where the decoded BER is very high (around 10%)), the modulation waveform could also be adjusted so that the relative received bit energy will allow the system to operate at a lower bit error rate. Modem diversity through symbol rate adjustment provides a lower bit error rate, providing a better match to the source encoding rate. This can be illustrated by studying the continuous channel capacity (Shannon-Hartley theorem) with additive white Gaussian noise. This is given by:

$$D = W\log_2(1+C/N) \quad (15)$$

where D is the channel capacity.

Under a noiseless condition (infinite C/N), the channel capacity is infinite for any non-zero bandwidth. For a fixed transmitter power and in the presence of additive white Gaussian noise (AWGN), the channel capacity is limited for a limited bandwidth, W, and C/N. As the channel noise increases, the channel capacity decreases, for a fixed W. If we transmit at capacity, the bit duration, $T_b$, is equal to $1/D$ and we can write equation (15) as:

$$R'_b/W = \log_2\left(1 + \frac{E_b R_b}{N_0 W}\right) \quad (16)$$

where $C=E_b*R_b$ (average received signal power), $R_b=1/T_b$, and $N=N_o*W$. From (16) it is apparent that in order to transmit reliable data at capacity over an increasingly noisy channel (i.e., where the capacity is dropping) where $D=R_b'$ as D drops so must $R_b'$. If we assume that the carrier power, C, is fixed and since $C=E_b*R_b$ the effective $E_b$ increases as $R_b$ drops for a fixed C (Avg. Signal Power). Even though this process reduces the transmitted bit (or symbol) rate, it will allow the system to continue operating at an arbitrarily low bit error rate.

This result is significant in a number of ways. First, providing this capability to extend to image quality also extends the link usability. This method also provides a means of guaranteeing image delivery rate, varying the transmitter power level, while providing the optimal level of image quality. If the system were operating at its maximum source information rate, as the channel capacity drops so does the ability to achieve a sufficiently low bit error probability and consequently causes the reconstructed image quality to degrade below that of a higher compression ratio (lower symbol rate at the modem). Additionally, the system could lose its ability to close the communications link (a downed link). This can easily be illustrated by imagining a link that is used in a mobile application where the link is subject to long duration deep fading. It is not uncommon in such a link to experience short-term fading on the order of 30 dB. Known technology does not provide sufficient link margin to establish a continuous link for this realistic scenario. The adaptive technique described here provides the capability to keep the communication link closed. Secondly, using fixed aggregate rate (i.e., symbol rate) systems, the source encoding rate could be significantly reduced. This, however, implies that the channel coding bit rate is significantly increased in order to meet the aggregate rate. High channel coding bit rates translate into significant code word set space, complex encoders and decoders, and thus could ultimately cause undesired channel coding and decoding delays. By allowing the aggregate rate to change and/or changing the modulation method, code word set spaces, complexity, and delay issues are minimized. This technique also allows the use of either embedded or multi-mode image coders.

This method and apparatus of the invention combines variable rate source and channel coding for digitally compressed imagery with adaptive modem design. It also provides a means of either guaranteeing an image delivery rate while providing optimal image quality for that rate or varying this rate. Although limited references can be found on each topic in exclusion, there are no known authors or manufacturers of such an adaptive technique for achieving high image quality in a communication system.

Figure 11:
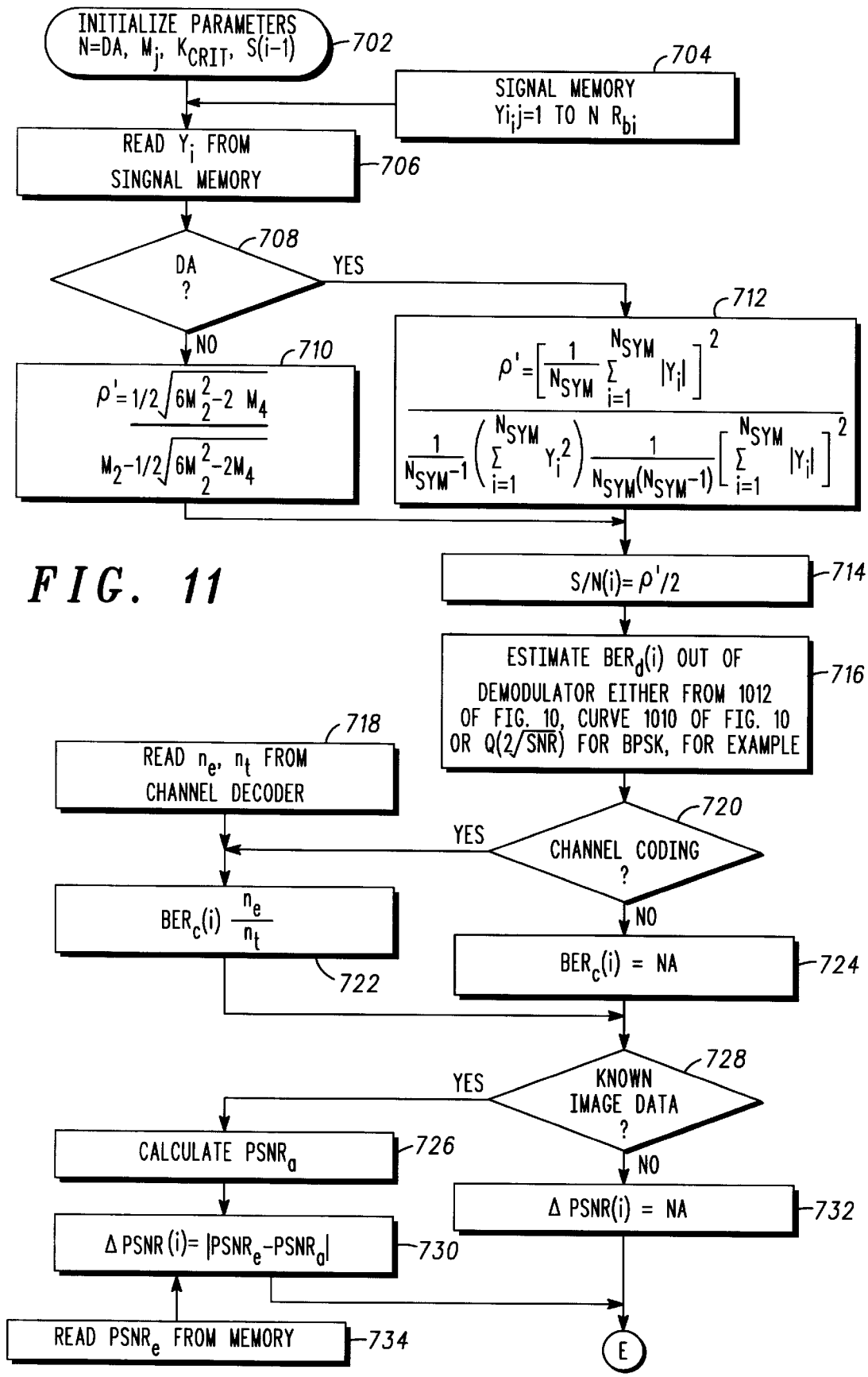
FIGS. 11 and 12 are flow diagrams of an operational flow within step 210 of FIG. 2.
Figure 12:
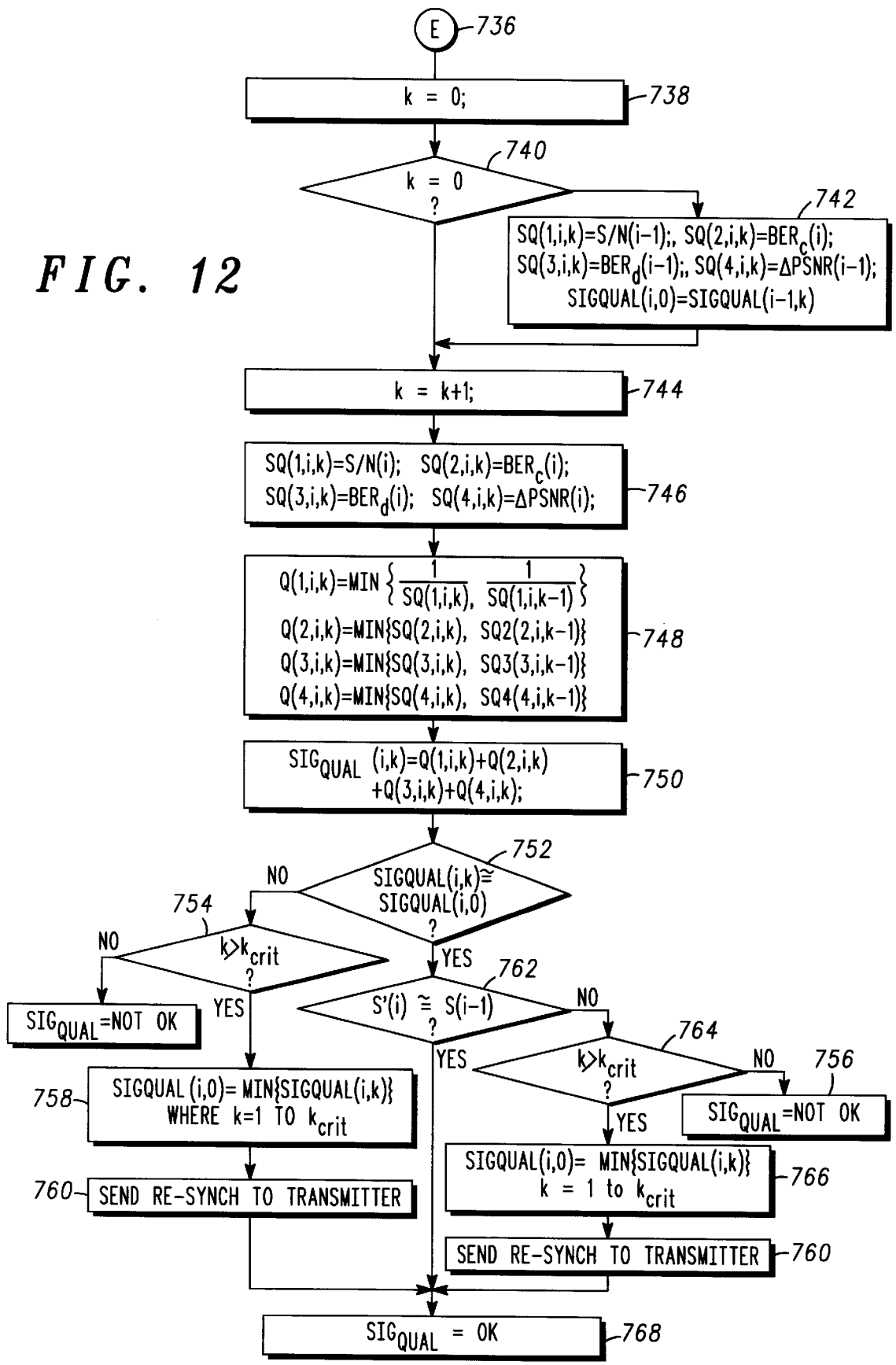

FIGS. 11 and 12 are flow diagrams illustrating the operational flow within step 210 of FIG. 2. In FIGS. 11 and 12 and the following description, the following symbols are used:

$y_i$ is the received signal into the receiver;

N is the number of past received signals to store in the memory;

DA specifies whether the SNR estimate data is aided (Y for yes and N for no);

ρ' is the signal to noise ratio estimate;

E{ } denotes the expected value operator;

$M_2$ is defined as $E\{y_i^2\}$;

$M_4$ is defined as $E\{y_i^4\}$;

$BER_d(i)$ is the bit error rate out of the demodulator for the $i^{th}$ received signal;

$BER_c(i)$ is the bit error rate out of channel coding;

NA denotes not applicable;

$n_e$ is the number of bit errors uncorrected by the channel coder;

$n_t$ is the total number of bits processed;

$PSNR_a$ is the peak signal to noise ratio of the reconstructed image;

$PSNR_e$ is the expected PSNR; and $k_{crit}$ is the maximum number of iterations the loop can go through before sending resynchronization notice to the transmitter.

With reference to FIG. 11, at step 702, the parameters are initialized. Signals are stored in memory at step 704. At step 706, the memory is read. The read signals from step 706 and the initialized parameters from step 702 are used at step 708 to determine whether a data aided (DA) signal to noise estimation procedure is used. If data aided estimation is not to be used, the equation shown in step 710 is used to calculate ρ'. If data aided estimation is to be used, the equation shown in step 712 is used to calculate ρ'. Regardless of which way ρ' is calculated, the signal to noise ratio is determined from the ρ' at step 714. In step 716, the bit error rate BER out of the demodulator is estimated. Various methods may be used to determine BER. For example, a table lookup method may be used, or BER may be directly determined or it may be computed, e.g., for BPSK, BER= $Q(\sqrt{S/N})$. From step 716, a determination is made as to whether channel coding is used at step 720. If channel coding is used, $BER_c(i)$ is computed at step 722. If no channel coding is used, $BER_c(i)$ is indicated as "not available" at step 724. A determination is made as to whether or not there is known transmitted image data at step 728. If there is known transmitted image data, the $PSNR_a$ is calculated at step 726. At step 730, the differential peak signal to noise ratio is calculated. If there is no known image data as determined from step 728, the peak signal to noise ratio is identified as "not available".

We then proceed to FIG. 12. At step 738, the k is set to the present iteration number. It should be appreciated that k=0 only when this routine is entered for the first time after each received signal y. At step 740, a determination is made as to whether it is the first iteration or not. If it is the first iteration, signal quality parameters are set at step 742. And the iteration identifier k is incremented at step 744, or if the iteration determination at step 740 is that it is not the first iteration, the iteration identifier is likewise incremented. At step 746, the signal quality parameters SQ are calculated. At step 748, a quality metric is determined according to equations. Then at step 750 the signal quality SIGQUAL(i,k) is determined for the $i^{th}$ signal and iteration k. At step 752, it is determined whether the signal for the present iteration is approximately equal to the signal quality for the initial iteration SIGQUAL(i,0), i.e., when k=0. If not, then at step 754 it is determined whether k is greater than $k_{crit}$. If it is, an indication is provided at step 756 that the signal is not "ok". If, however, k is greater than $k_{crit}$, the signal quality is set equal to approximately a minimum as indicated at step 758 from which a re-synchronization signal is sent to the transmitter at step 760. If the result of step 752 is affirmative, a determination is made as to whether the estimated S(i), S'(i), is approximately the same as the previous S(i−1) at step 762. If it is, then at step 768, the "Y" path from decision step 220 (i.e., $sig_{qual}$=OK) FIG. 2 is taken. If it is not, k is determined to be greater than $k_{crit}$ or not at step 764. If it is not greater, then the "N" path is taken from step 220 of FIG. 2 (i.e., $sig_{qual}$=not OK). If it is greater, at step 766 the signal quality is set equal to approximately a minimum as was done at step 758 and a resynchronization signal is sent to the transmitter at step 760.

In step 748 it is not only important to find Q but also to make sure that Q(1,i,k), Q(2,i,k), Q(3,i,k), Q(4,i,k) are all in the same channel state as shown in FIG. 13. FIG. 13 illustrates a plot of BER vs. SNR for BPSK modulation. The characteristic curve 1010 for no channel coding traverses four decision regions. Region 1002 represents a very bad channel (1). Region 1004 is where the channel is bad (2). Region 1006 is where the channel is nominal (3). Region 1008 defines where the channel is good (4). For other modulation types, the other values of the BER vs. SNR can be calculated and stored as modulation performance tables in memory.

FIG. 14 illustrates plots of PSNR vs. $C/N_o$. Curve 1102 illustrates the characteristic performance curve for the image coder at 1 bit/pixel, no channel coding, full rate D4PSK modulation. Curve 1104 is for the image coder at ½ bits/pixel, ½ rate of convolutional channel coding, and full rate D4PSK modulation. Curve 1106 is for the image coder being set to ¼ bits per pixel, ½ rate channel coding, and ½ rate D4PSK. Threshold 1110 establishes a region in which the channel is considered good. This corresponds to channel state 4. Region 1112 defines a region in which the channel is considered nominal corresponding to channel state 3. Region 1114 defines a region in which the channel is bad corresponding to channel state 2. Region 1116 defines a region in which the channel is very bad corresponding to channel state 1.

Figure 15:
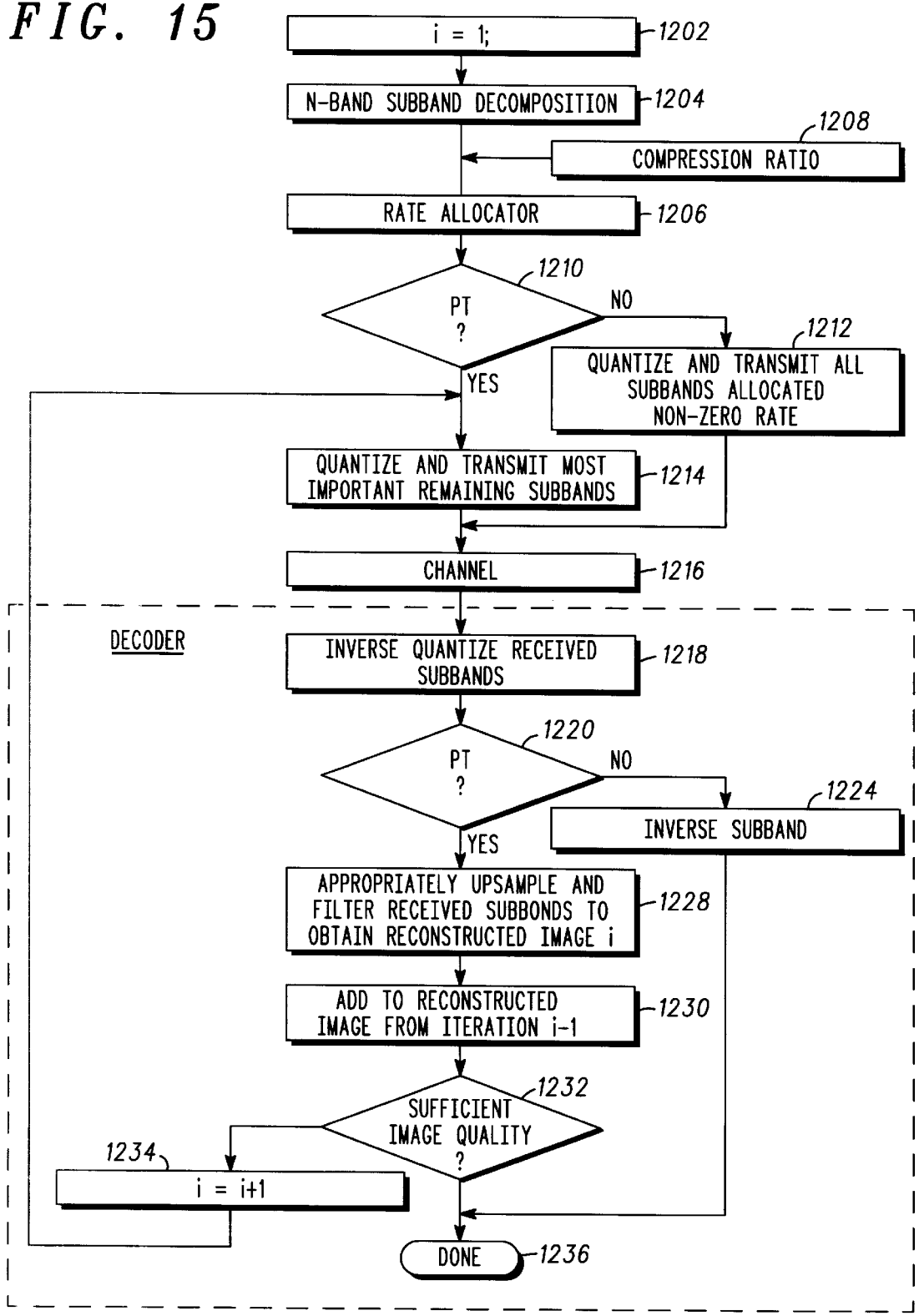
FIG. 15 is a flow diagram of operation of a subband image coder incorporating progressive transmission.

The present invention may be utilized for the transmission of still images, video images, and hyperspectral image codes. FIG. 15 illustrates transmission of still images with the subband image coder incorporating progressive transmission. At step 1202, the progressive transmission iteration i is set equal to 1. At step 1204, N-band subband decomposition is performed by successive low pass and high pass filtering operations followed by subsampling by a factor of 2. At step 1206, an optimum allocation of bits for the various subbands is calculated using a compression ratio input at step 1208. At step 1210, a determination is made as to whether or not to operate the encoder in the progressive transmission mode. If it is decided not to operate the encoder in the progressive transmission mode, then step 1212 takes each 2-D subband and groups the samples into a 1-D sequence and quantizes each sequence using a quantizer at a rate specified by a rate allocation block. If it is decided at step 1210 to operate the encoder in the progressive transmission mode, then step 1214 finds the most important subbands and quantizes them to the rate specified by the rate allocation module. The outputs of steps 1212 and 1214 are applied to an available channel at step 1216 (for example, passing through channel coder (FEC) 111, modulator 113, and antenna 102 before being transmitted on link 105). At step 1217, the quantization procedure is revised to convert the quantizer indices to reconstructed codeword values. At step 1220, a determination is made as to whether or not the decoder is to be placed into the progressive transmission mode. If not, at step 1224 image pixels are reconstructed through subband reconstruction by successive application of interpolation and filtering of the subbands. At step 1236, the operation is complete.

If at step 1220 it is determined to place the decoder into the progressive transmission mode, reconstruction of the image occurs through appropriately upsampling and filtering of received subbands to obtain the reconstructed image iteration. At step 1230, the reconstructed image is added to the reconstructed image from the prior iteration. At step 1232, it is determined if the subbands sent for pictures of an image are of sufficient quality, e.g., adequate PSNR. If the image quality is determined to be sufficient, the process is done as indicated by step 1236. If on the other hand, the image quality is not sufficient the progressive transmission counter is incremented by one at step 1234 and the process is repeated from step 1214. The decision to continue the progressive transmission process is made at the receiver 103 of FIG. 1 and sent to the transmitter 101 via the feedback channel.

What is claimed is:

1. Apparatus for the transmission of digital images, comprising:
    a source of image information in digital form;
    a transmitter coupled to said source for the transmission of digital image information;
    an image data sink for utilizing received digital image information;
    a receiver for receiving said digital image information and providing said received digital image information to said image data sink;
    a communications channel between said transmitter and said receiver for transmission of image data from said transmitter to said receiver;
    a feedback channel for providing quality information from said receiver to said transmitter, said information being indicative of quality of said received digital image information over said communication channel;
    whereby said transmitter is responsive to said quality information such that transmission parameters are varied at said transmitter to provide high quality image information at said receiver; and
    said feedback channel comprising:
    a channel status monitor; and
    a channel status estimator for instructing said channel status monitor to vary power level, baud rate, channel code rate, compression ratio and delivery rate of said transmitter for transmitting said digital image information.

2. The system, as claimed in claim 1, wherein:
    said transmitter comprises a channel status monitor for receiving and processing said quality information to generate at least one control signal.

3. The system, as claimed in claim 2, wherein:
    said transmitter is operable to provide a plurality of power output levels and is responsive to said channel status monitor for selecting one of said power output levels.

4. The system, as claimed in claim 2, wherein:
    said transmitter comprises an image encoder for performing image encoding on said image information, said image encoder being operable at multiple encoding rates and responsive to said channel status monitor for selecting one of said multiple encoding rates.

5. The system, as claimed in claim 2, wherein:
    said transmitter comprises a channel coder for providing channel coding to said image information, said channel coder being operable at a plurality of coding rates and responsive to said channel status monitor for selecting one of said coding rates.

6. The system, as claimed in claim 5, wherein:
    said channel coder is selectively operable in a plurality of coding strategies, said channel coder being responsive to said channel status monitor for selecting one of said coding strategies.

7. The system, as claimed in claim 2, wherein:
    said transmitter is operable to transmit said digital image information at a plurality of image delivery rates, said transmitter being responsive to said channel status monitor for selecting one of said image delivery rates.

8. The system, as claimed in claim 2, wherein:
    said transmitter is operable to provide a plurality of power output levels;
    said transmitter comprises an image coder for providing image coding to said image information, said image encoder being operable at multiple image coding rates;
    said transmitter comprises a channel coder for providing channel coding to said image information, said channel coder being operable at a plurality of channel coding rates; and
    said transmitter is responsive to said channel status monitor for selectively changing at least one of: a present power output level, a present baud rate, a present image coding rate, and a present channel coding rate when said quality information indicates a change in quality of said communications channel.

9. The system, as claimed in claim 1, wherein:
    said receiver comprises an image decoder for removing image coding from said communications signal, wherein said image decoder provides at least a portion of said quality information.

10. The system, as claimed in claim 1, wherein:
    said receiver comprises a channel decoder for removing channel coding from said communications signal, wherein said channel decoder provides at least a portion of said quality information.

11. The system, as claimed in claim 1, wherein:
    said quality information is derived from one or more of the following: a signal to noise parameter, a bit error rate, and a symbol error rate.

* * * * *